United States Patent Office 2,760,963
Patented Aug. 28, 1956

2,760,963
PHENANTHRIDINE COMPOUNDS

Thomas Iswel Watkins, Nottingham, England, assignor to Boots Pure Drug Company Limited, Nottingham, England, a British company No Drawing. Application May 29, 1952,
Serial No. 290,820

Claims priority, application Great Britain June 8, 1951

4 Claims. (Cl. 260—286)

This invention relates to new phenanthridine derivatives which have been found to possess valuable properties.

The invention consists in the compounds of the general formula

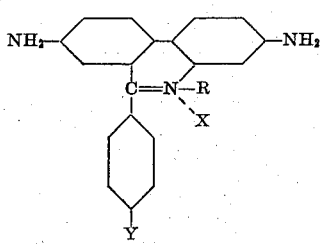

in which R represents an alkyl or alkenyl radical containing at least two carbon atoms, X represents an anion, and Y represents $NH_2$ or $NO_2$.

It is known that the 2:7-diamino-9-p-nitrophenyl-10-methyl-phenanthridinium chloride and the corresponding 9-p-aminophenyl compound possess trypanocidal activity. We have found compounds of the present invention to possess unexpectedly greater activity or therapeutic efficiency than these known compounds. It has not previously been suggested that the nature of the quaternary radical attached to the ring nitrogen has any influence on the trypanocidal activity of aminophenanthridinium compounds and our discovery that replacement of the methyl radical in the known compounds by other radicals increases the activity or therapeutic efficiency of the products could not have been predicted.

The nitro compounds of the invention may be prepared by quaternisation of a phenanthridine of the general formula

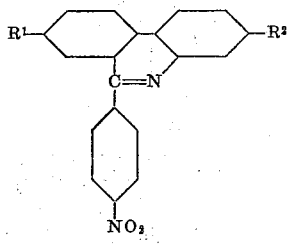

with a substance of the general formula RX, R and X being as defined above and $R^1$ and $R^2$ each representing a group convertible to an amino group which is so converted after the quaternation step. To produce the corresponding 9-p-aminophenyl-compound the nitro compound may be subjected to reduction. Alternatively the 9-p-aminophenyl compounds may be prepared by quaternating a phenanthridine of the general formula

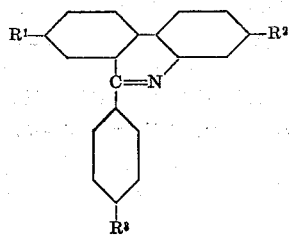

with a substance of the general formula R.X, R and X being as defined above and $R^1$, $R^2$ and $R^3$ each representing a group convertible to an amino group which is so converted after the quaternation step.

The invention is further illustrated by the following non-limitative examples.

Example 1

In the preparation of 2:7-diamino-9-p-nitrophenyl-10-allylphenanthridinium chloride, a mixture of 10 g. of 2:7 - dicarbethoxyamino - 9 - p - nitrophenylphenanthridine (prepared according to the method of Walls, J. C. S., 1950, 46), 10 cc. of allyl iodide and 50 cc. of anhydrous nitrobenzene is heated at 100° C. for 24 hours with slow stirring. 25 cc. of ether is added to the cooled product and the solid which separates (some solid has already deposited before the addition of the ether) is isolated by filtration, is well washed on the filter with ether and is finally extracted with boiling ether. The crude product is dissolved in 80 cc. of nitrobenzene at circa 120° C., the hot solution is filtered and the cooled filtrate is treated with sufficient ether to cause crystallisation. The product which separates is isolated by filtration, is washed with ether and is dried in air. There is thus obtained 2:7-dicarbethoxyamino-9-p-nitrophenyl-10-allylphenanthridinium iodide in the form of a yellow crystalline solid which has a melting point of circa 225° C. (with decomposition).

6.8 g. of the quaternary compound so obtained is dissolved in a mixture of 600 cc. of alcohol and 50 cc. of water and the hot solution is treated with a solution of 4 g. of silver methanesulphonate in 15 cc. of water. The silver iodide which separates is isolated by filtration from the cooled solution. The filtrate is acidified by the addition of 0.5–1 cc. of methanesulphonic acid and is concentrated under reduced pressure to a volume of approximately 150 cc. The solid which has separated is isolated by filtration. There is thus obtained 2:7-dicarbethoxyamino - 9 - p - nitrophenyl - 10 - allyl - phenanthridinium methane-sulphonate in the form of an orange-yellow crystalline solid which has a melting point of circa 210° C.

4 g. of the methanesulphonate so obtained is heated at 125° C. for 30 minutes, with occasional stirring, with a mixture of 10 cc. of concentrated sulphuric acid and 5 cc. of water. The cooled mixture is poured into a solution of 100 cc. of alcohol and 250 cc. of water and the pH of the solution is adjusted to 7.3 by the addition of ammonium hydroxide solution before the solution is concentrated under reduced pressure to a volume of approximately 150 cc. The cooled residue consists of a black tar and a supernatant liquor which is decanted and discarded. The tar is extracted with successive portions of 100 cc., 50 cc. and 50 cc. of hot water each extract being filtered separately. The combined extracts whilst still hot are treated with 10 g. of ammonium chloride and the solution is cooled. The solid which separates is isolated by filtration and is recrystallised from hot water. There is thus obtained 2:7-diamino-9-p-nitrophenyl-10-allylphenanthridinium chloride in the form of a purple crystalline solid which has a melting point of 266–267° C. (Found N, 13.7; Cl, 8.3; $C_{22}H_{19}O_2N_4Cl$ requires N, 13.75; Cl, 8.7.)

Example 2

A solution of 4 g. of 2:7-diamino-9-p-nitrophenyl-10-allylphenanthridinium chloride in 240 cc. of water is heated on the steam bath with stirring. To this solution is added a paste prepared by adding a hot concentrated solution of 24 g. of barium hydroxide octahydrate (in water from which all carbon dioxide has previously been removed by boiling) to a hot concentrated solution of 22.5 g. of ferrous sulphate heptahydrate (in water from which all carbon dioxide has been removed). The resulting mixture is heated, with stirring, at 95° C. for 30 minutes and whilst still hot is quickly filtered through a pre-heated Buchner funnel. The insoluble residue on the filter is extracted with 50 cc. of hot water and the filtered extract is added to the major portion of filtrate. The combined liquors are heated to 95° C. for 15 minutes with a further portion of a paste prepared as described above from 7.4 g. of ferrous sulphate heptahydrate and 8 g. of barium hydroxide octahydrate. The hot mixture is again filtered through a pre-heated Buchner funnel and the filtrate is concentrated under reduced pressure to a volume of circa 150 cc. The residue is heated to boiling point and is filtered. The hot filtrate is treated with 17 g. of ammonium chloride and is allowed to cool to room temperature. The tar which separates is dissolved in 75 cc. of hot water and the hot solution is treated with 10 g. of ammonium chloride. The mixture is allowed to stand over-night and the tar which separates is washed with a little ice water and is dried in vacuo over concentrated sulphuric acid. The solid which is thus obtained is recrystallised from a mixture of ethyl alcohol and isopropyl alcohol. There is thus obtained 2:7 - diamino - 9 - p - aminophenyl - 10 - allylphenanthridinium chloride in the form of a purple crystalline solid which has a melting point of 245° C. (Found, N, 14.6; Cl, 9.5; $C_{22}H_{21}N_4Cl$ requires N, 14.8; Cl, 9.4.)

*Example 3*

In the preparation of 2:7-diamino-9-p-nitrophenyl-10-propylphenanthridinium chloride, a mixture of 24 g. of 2:7 - dicarbethoxyamino - 9 - p - nitrophenylphenanthridine, 22 g. of propyl toluene-p-sulphonate and 16 cc. of anhydrous nitrobenzene is heated at 155–160° C. for 5 hours. The liquid mixture which is initially formed gradually solidifies. The solid is cooled and is extracted with boiling ether before being dried in air. There is thus obtained 2:7-dicarbethoxyamino-9-p-nitrophenyl-10-propylphenanthridinium p-toluene sulphonate in the form of a yellow solid which has an indefinite melting point. 27 g. of this quaternary compound is heated at 125–130° C. for 35 minutes with a mixture of 60 cc. of concentrated sulphuric acid and 30 cc. of water. The cooled solution is poured into 1.25 litres of ice water and the pH of the solution is adjusted to 7.0. The mixture is heated to the boiling point and the hot solution is treated with 100 g. of ammonium chloride before being cooled to 0° C. over-night. The tar which separates is extracted with 600 cc. of hot water, the hot solution is filtered and the filtrate is treated with 25 g. of ammonium chloride. The product which separates on standing is isolated by filtration and is recrystallised from water containing a small quantity of ammonium chloride. There is thus obtained 2:7-diamino-9-p-nitrophenyl-10-propylphenanthridinium chloride in the form of a black crystalline solid which has a melting point of 278–279° C. (Found N, 14.1; Cl, 8.9; $C_{22}H_{21}O_2N_4Cl$ requires N, 13.7; Cl, 8.7.)

*Example 4*

2:7 - diamino - 9 - p - nitrophenyl - 10 - propylphenanthridinium chloride obtained as described in Example 3 is reduced by the procedure described in Example 2 for 2:7-diamino-9-p-nitrophenyl-10-allylphenanthridinium chloride. There is thus obtained 2:7-diamino - 9 - p - aminophenyl - 10 - propylphenanthridinium chloride in the form of a red solid which has a melting point of 295° C. with decomposition. (Found N, 14.6; Cl, 9.7; $C_{22}H_{23}N_4Cl$ requires N, 14.8; Cl, 9.4.)

*Example 5*

In the preparation of 2:7-diamino-9-p-nitrophenyl-10-ethylphenanthridinium chloride, a mixture of 27 g. of 2:7 - dicarbethoxyamino - 9 - p - nitrophenylphenanthridine, 25 c. c. of diethylsulphate and 80 c. c. of anhydrous nitrobenzene is heated at 155° C. for 90 minutes. The cooled reaction mixture is treated with 30 c. c. of ether and the solid which separates is isolated by filtration, extracted with boiling ether and dried in air. There is thus obtained 2:7-dicarbethoxyamino-9-p-nitrophenyl-10-ethylphenanthridinium ethosulphate in the form of crystalline solid which has an indefinite melting point. 32 g. of this quaternary salt is heated at 125–130° C. for 30 minutes with a mixture of 80 c. c. of concentrated sulphuric acid and 40 c. c. of water. The cooled solution is poured into 1 litre of ice water and the pH of the mixture is adjusted to 7.0 by the addition of aqueous ammonium hydroxide. The solution so obtained is heated to boiling point, the hot solution is treated with 80 g. of ammonium chloride and the mixture is allowed to stand at 0° C. overnight. The solid which separates is isolated by filtration and is extracted with successive portions of 200 c. c., 400 cc. and 100 cc. of hot water. The combined extracts are adjusted to pH 7.2 by the addition of a few drops of aqueous ammonium hydroxide and the solution is treated with 50 g. of ammonium chloride. The mixture is allowed to stand at 0° C. overnight and the solid which separates is isolated by filtration, washed with a small quantity of ice water and dried at 100° C. There is thus obtained 2:7-diamino - 9 - p - nitrophenyl - 10 - ethylphenanthridinium chloride in the form of a black crystalline solid which has a melting point of 268–270° C. (Found N, 14.05; $C_{21}H_{19}O_2N_4Cl$ requires N, 14.2.)

*Example 6*

2:7 - diamino - 9 - p - nitrophenyl - 10 - ethylphenanthridinium chloride obtained as described in Example 5 is reduced by the procedure described in Example 2 for the reduction of 2:7-diamino-9-p-nitrophenyl-10-allylphenanthridinium chloride. There is thus obtained 2:7-diamino - 9 - n - aminophenyl - 10 - ethylphenanthridinium chloride in the form of a dark red crystalline solid which has a melting point of 290° C. (with decomposition). (Found N, 15.2; $C_{21}H_{21}N_4Cl$ requires N, 15.3.)

I claim:

1. A compound of the general formula

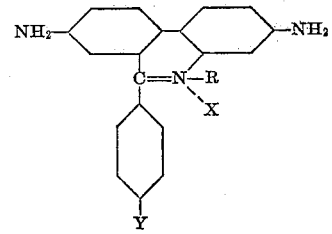

where R represents a radical taken from the group consisting of ethyl, propyl and allyl radicals, X represents a non-toxic anion and Y represents a radical taken from the group consisting of amino and nitro radicals.

2. A compound as claimed in claim 1, in which R is ethyl.

3. A compound as claimed in claim 1, in which R is propyl.

4. A compound as claimed in claim 1, in which R is allyl.

References Cited in the file of this patent

UNITED STATES PATENTS 2,594,265    Walls                Apr. 22, 1952
2,622,082    Short et al.         Dec. 8, 1953

OTHER REFERENCES

Kabete, Nature, vol. 169, pp. 666–67 (1952).